(12) United States Patent
Risbood

(10) Patent No.: US 7,715,716 B2
(45) Date of Patent: *May 11, 2010

(54) METHODS AND APPARATUS FOR OPTIMIZING UTILIZATION IN RECONFIGURABLE OPTICAL ADD-DROP MULITPLEXER BASED RING NETWORK

(75) Inventor: Pankaj Risbood, Karnataka (IN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1088 days.

This patent is subject to a terminal disclaimer.

(21) Appl. No.: 11/337,636

(22) Filed: Jan. 23, 2006

(65) Prior Publication Data

US 2007/0172237 A1      Jul. 26, 2007

(51) Int. Cl.
*H04B 10/20* (2006.01)

(52) U.S. Cl. .................... 398/59; 398/3; 398/4; 398/83; 370/254; 370/255; 385/24; 385/16; 385/17; 385/18

(58) Field of Classification Search ............. 398/59, 398/79, 98, 99, 100, 70, 71, 72, 58, 45, 46, 398/48, 50, 52, 56, 54, 83, 69, 3, 4; 370/254, 370/255; 385/24, 16, 17, 18

See application file for complete search history.

(56) References Cited

U.S. PATENT DOCUMENTS

| 6,075,631 | A  | * | 6/2000 | Bala et al. ................. 398/1 |
| 7,349,341 | B2 |   | 3/2008 | Allasia et al. |
| 2002/0131103 | A1 | * | 9/2002 | Bambos ................. 359/118 |
| 2006/0193632 | A1 | * | 8/2006 | Risbood ................. 398/59 |

OTHER PUBLICATIONS

T.J. Carpenter et al., "Demand Routing and Slotting on Ring Networks;" DIMACS Technical Report Feb. 1997, 30 pages, Jan. 1997.
A.A.M. Saleh et al., "Architectural Principles of Optical Regional and Metropolitan Access Networks," Journal of Lightwave Technology, vol. 17, No. 12, pp. 2431-2448, Dec. 1999.
M.D. Feuer et al., "Routing Power: A Metric for Reconfigurable Wavelength Add/Drops," OFC, pp. 156-158, 2002.

(Continued)

*Primary Examiner*—Hanh Phan
(74) *Attorney, Agent, or Firm*—Ryan, Mason & Lewis, LLP

(57) ABSTRACT

Techniques are disclosed for generating a hitless migration plan to optimal state, given an optimal routing and wavelength assignment for demands. For example, a technique for use in performing a circuit transition in accordance with an optical ring-based network comprises obtaining a first (e.g., initial) circuit layout and a second (e.g., final) circuit layout for a given set of demands to be routed on the optical ring-based network. The technique then comprises calculating a transition sequence plan useable to transition the network from the first circuit layout to the second circuit layout such that substantially no network service disruption occurs due to the circuit transition. The transition sequence plan is calculated by determining a minimum set of circuits that when moved from first positions in the first circuit layout result in a feasible transition sequence for remaining circuits in the first circuit layout. Wavelength equivalence and demand equivalence properties may be applied individually or jointly.

20 Claims, 10 Drawing Sheets

OTHER PUBLICATIONS

S. Acharya et al., "Hitless Network Engineering of SONET Rings," IEEE Globecom, 5 pages, 2003.

G. Even et al., "Approximating Minimum Feedback Sets and Multi-Cuts in Directed Graphs," Algorithmica, vol. 20, No. 2, pp. 151-174, 1998.

Y-S. Myung et al., "Optimal Load Balancing On SONET Bidirectional Rings," ABI/INFORM Global, Operations Research, vol. 45, No. 1, pp. 148-152, Jan.-Feb. 1997.

A. Tucker, "Coloring a Family of Circular Arcs," SIAM Journal of Applied Mathematics, vol. 29, No. 3, pp. 493-502, Nov. 1975.

Gerstel et al., "Wavelength Assignment in a WDM Ring to Minimize Cost of Embedded SONET Rings," Proc. IEEE Infocom'98, 1998, pp. 94-101, vol. 1.

K. Bala et al., "Towards Hitless Reconfiguration in WDM Optical Networks for ATM Transport," Global Telecommunications Conference, GLOBECOM '96, Nov. 1996, pp. 316-320, vol. 1.

M. Saad et al., "Reconfiguration with No Service Disruption in Multifiber WDM Networks," Journal of Lightwave Technology, Oct. 2005, pp. 3092-3104, vol. 23, No. 10.

A. Schrijver et al., "The Ring Loading Problem," SIAM Journal on Discrete Mathematics, Feb. 1998, pp. 1-16.

S. Cosares et al., "An Optimization Problem Related to Balancing Loads on SONET Rings," Telecommunications Systems, Jul. 1994, pp. 165-181, vol. 3.

Y-S. Myung et al., "On the Ring Loading Problem with Demand Splitting: A Faster Algorithm and Experimental Evaluation," Operations Research Letters, Mar. 2004, pp. 1-15.

* cited by examiner

FIG. 1
PRIOR ART

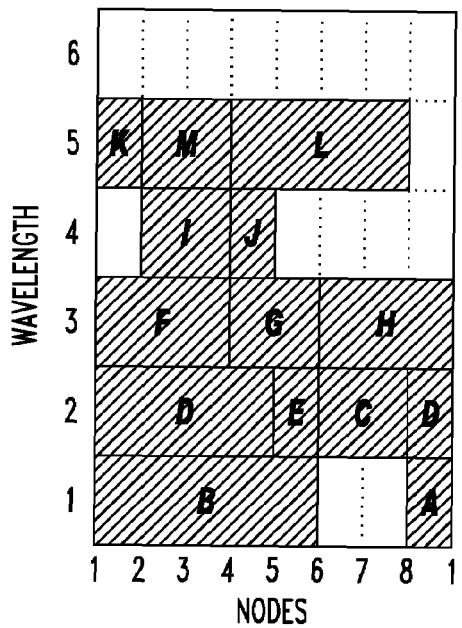
(A) INITIAL RWA

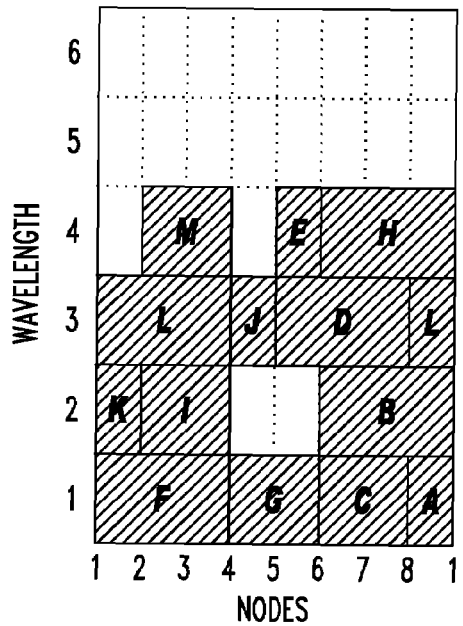
(B) FINAL RWA

FIG. 2

| SEQ NUMBER | MOVE TYPE | DESCRIPTION |
|---|---|---|
| 1 | b | MOVE B TO WAVELENGTH 6 |
| 2 | b | MOVE C TO WAVELENGTH 1 |
| 3 | b | MOVE G TO WAVELENGTH 1 |
| 4 | b | MOVE F TO WAVELENGTH 1 |
| 5 | b | MOVE H TO WAVELENGTH 4 |
| 6 | b | MOVE E TO WAVELENGTH 4 |
| 7 | c | REROUTE/MOVE D TO WAVELENGTH 3 |
| 8 | c | REROUTE/MOVE L TO WAVELENGTH 3 |
| 9 | b | MOVE J TO WAVELENGTH 3 |
| 10 | b | MOVE K TO WAVELENGTH 2 |
| 12 | b | MOVE I TO WAVELENGTH 2 |
| 13 | b | MOVE M TO WAVELENGTH 4 |
| 14 | c | REROUTE/MOVE B TO WAVELENGTH 2 |

FIG. 3

DGBM ALGORITHM

- Input: Demand set $D$, initial and final RWA $\psi$ and $\psi'$
- Output: Circuit migration sequence 1) Let the number of unused wavelengths in $\psi$ be $f$
2) Generate dependency graph $G_{dep}$ for demands in $D$
3) Find feedback vertex set $F$ for $G_{dep}$ and the residual DAG $G_{dag}$
4) For set of demands in $F$ perform RWA to obtain number of free wavelengths required $(r)$
5) if $(r > f)$ declare no migration possible
6) else
   a) Reroute demands in $F$ to free wavelengths (as given by RWA in step 4)
   b) Perform topological sort of $G_{dag}$ and reroute demands in reverse sort order
   c) Reroute demands in $F$ to their final state

FIG. 4

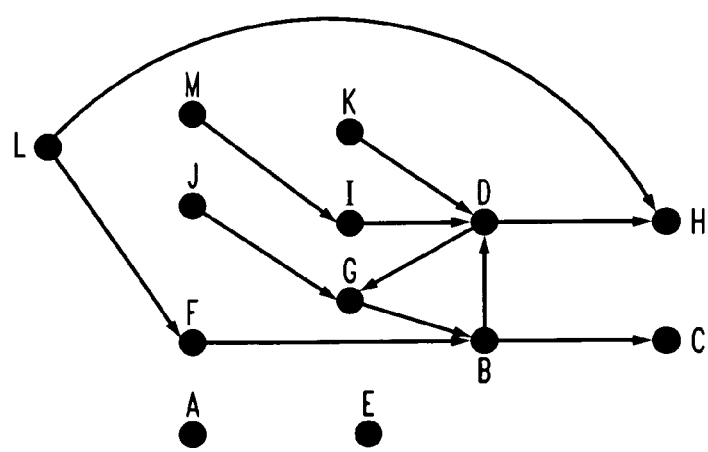

*FIG. 5*

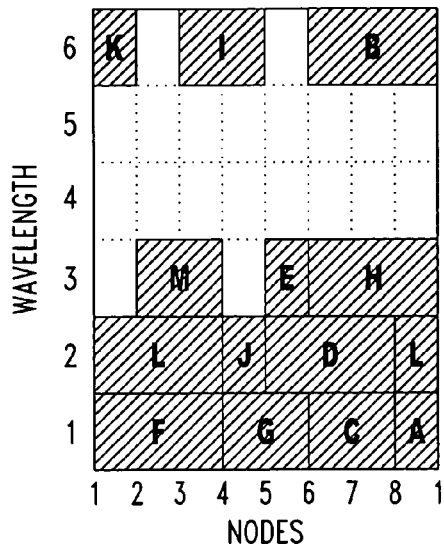

*FIG. 6*

```
              DGBM-WE ALGORITHM
- Input: Demand set D, initial and final RWA ψ and ψ'
- Output: Circuit migration sequence
1) Let the number of unused wavelengths in ψ be f
2) Generate dependency graph G_dep for demands in D
3) sortIndx ← 0
4) revSortIndx ← number of wavelengths
5) Repeat
       a) if ∃ n_i ∈ G_dep s.t. indeg(n_i) = 0
              i) Index(n_i) ← sortIndx
             ii) sortIndx ← sortIndx + 1
            iii) Remove n_i from G_dep
       b) else if ∃n_i ∈ G_dep s.t. outdeg(n_i) = 0
              i) Index(n_i) ← revSortIndx
             ii) revSortIndx ← revSortIndx - 1
            iii) Remove n_i from G_dep
       c) else /* All nodes are part of some cycle */
              i) if (f = 0) declare no migration possible
             ii) Find node n_j ∈ G_dep s.t. min(indeg(j), outdeg(j)) ≥
                  min(indeg(k), outdeg(k)) ∀n_k ∈ G_dep
            iii) Find set of nodes F_j for n_j (demands that share
                  wavelength with d_j in ψ')
            iv) Reroute all demands in F_j to a free wavelength.
             v) Remove all nodes in F_j from G_dep
            vi) Index(n_k) ← -1 ∀n_k ∈ F_j
           vii) f ← f -1
6) Until G_dep contains a node
7) ∀d_k s.t. Index(n_k) ≠ -1 Reroute to final state in Index(n_k) order
```

FIG. 7

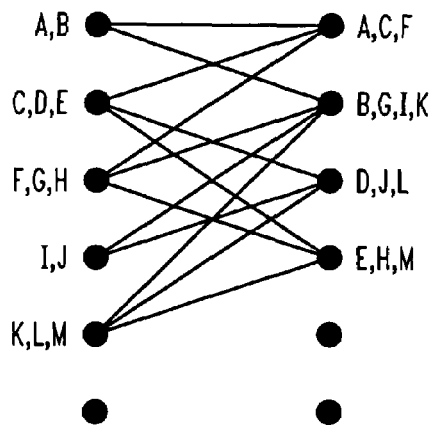

FIG. 8

DP ALGORITHM

- Input: For a connected component of transition graph—Demand set $D$, initial and final partition sets $P_o$ and $P_f$ of $D$
- Output: A sequence of intermediate states in transition minimizing number of free wavelengths required 1) For each state $S_i$ in state space of size $2^{W_f}$, where $W_f = |P_f|$
   a) initialize bit vector
   b) Initialize $W_i$ /* Number of wavelength needed */
   c) $N_{if} \leftarrow -1$ /* Free wavelength required */
   d) $I_i \leftarrow -1$ /* Next state in optimal migration */
2) $N_{ff} \leftarrow 0$
3) FindMinTransition(0)
4) Output intermediate states as pointed by $I_i$ values starting from $S_0$ and circuit reroutes for each state transition.

subroutine FindMinTransition (state $i$)

1) if $(N_{if} \neq -1)$ return $N_{if}$
2) $N_{if} \leftarrow MAXVAL;$
3) For each state $j$ s.t. $\{P_j \cap P_f\} - \{P_i \cap P_f\}$ has exactly one set $T$
   a) $tmp$ = FindMinTransition($j$) $- (W_i - W_j)$
   b) $tmp$ = max $(0, tmp)$
   c) if $(tmp < N_{if})$
      i) $N_{if} \leftarrow tmp$
      ii) $I_i \leftarrow j$
4) return $N_{if}$ FIG. 10
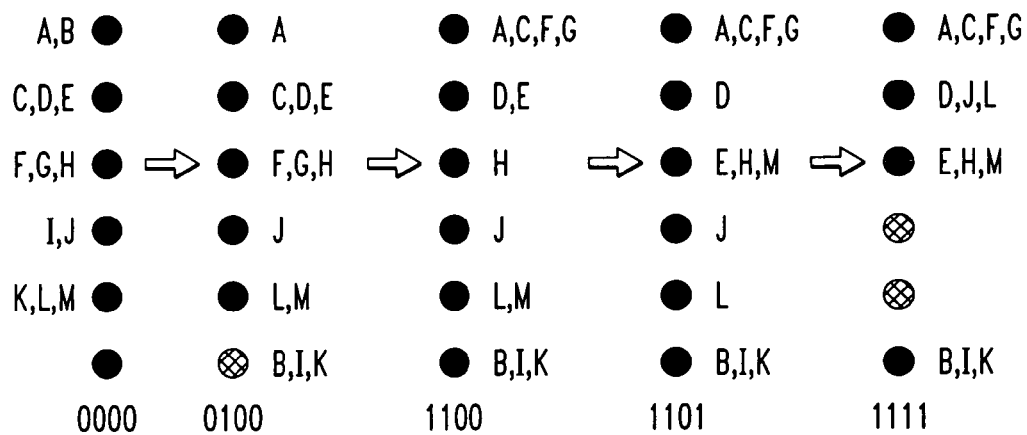
FIG. 11
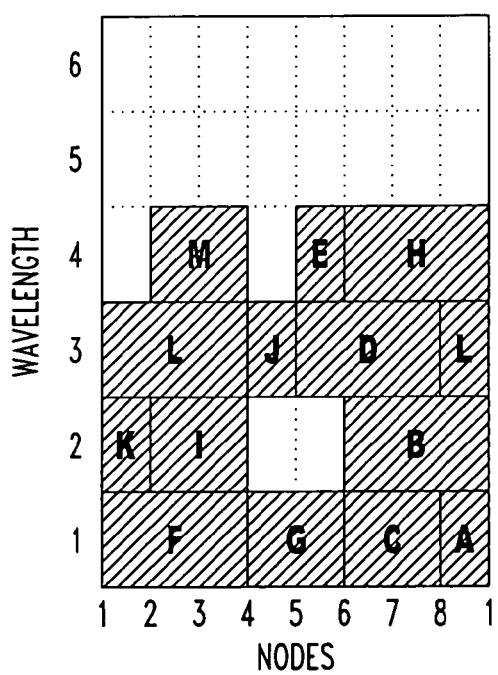
(A) FINAL RWA
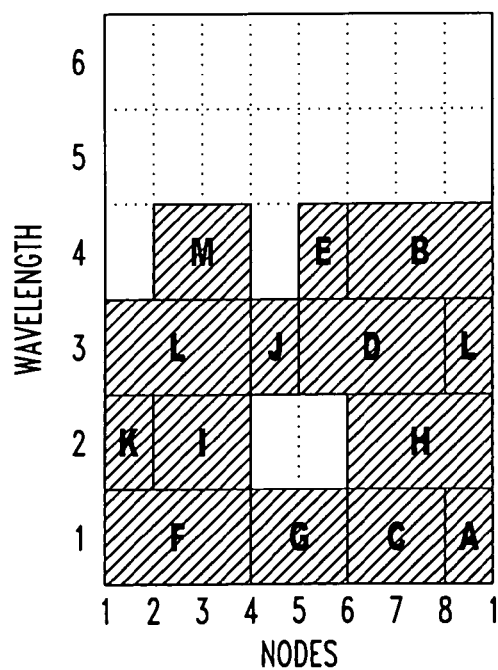
(B) EQUIVALENT RWA

*FIG. 12*

GM-T ALGORITHM

- Input: Demand set $D$, initial and final map $\psi$ and $\psi'$ for a single wave band
- Output: Circuit migration sequence 1) from $\psi$ and $\psi'$ obtain partition sets $P_0$ and $P_f$ of $D$
2) Replace demands in $P_0$ and $P_f$ by their types to obtain $T_0$ and $T_f$
3) while $T_f \neq \phi$
    a) if $\exists\ \delta \in T_0$ and $\theta \in T_f$ s.t. $\delta \subseteq \theta$ and $\delta \neq \phi$
        i) For each type $ty$ in $\theta - \delta$
            A) Find a demand of type $ty$ in some set in $T_0$ with least number of elements.
            B) Move that demand to $\delta$ and record the circuit migration.
    b) remove $\delta$ from $T_i$ and $\theta$ from $T_f$

*FIG. 13*

| NODES/ RING | WAVELENGTHS/ BAND | ALGORITHMS | CHURN ERLANG | FREE WAVELENGTHS |
|---|---|---|---|---|
| 4<br>8<br>16 | 8<br>16<br>32 | DGBM<br>DGBM-WE<br>GM<br>DP<br>GM-T | $\infty$<br>4W | 0<br>1<br>..<br>W/4 |

METHODS AND APPARATUS FOR OPTIMIZING UTILIZATION IN RECONFIGURABLE OPTICAL ADD-DROP MULITPLEXER BASED RING NETWORK

FIELD OF THE INVENTION

The present invention relates generally to the field of data communication networks and, more particularly, to optimized utilization techniques for use in accordance with ring networks.

BACKGROUND OF THE INVENTION

Wavelength Division Multiplexing (WDM) is a type of multiplexing developed for use on an optical fiber. WDM modulates each of several data streams onto a different part of the light spectrum. That is, WDM transmits each data stream at a different optical wavelength.

WDM has established itself as an inexpensive and reliable mechanism for transporting information bits in metro and long-haul networks. WDM networks also provide the underlying transport for the growing Internet data traffic that has more variance and, therefore, creates greater network churn. As this traffic continues to grow and capital budgets fail to keep up (or, even shrink), service providers are increasingly seeking tools that enable them to extract higher utilization from their existing infrastructure.

Of course, the desire to extract higher utilization from a network is not restricted to WDM networks. Other types of ring networks benefit from improved network utilization techniques. For instance, improved network utilization techniques would be equally beneficial in ring networks based on synchronous optical network (SONET) or synchronous digital hierarchy (SDH) standards, particularly when all circuits are of uniform granularity.

Traditional optimization tools solve the problem of improving network utilization by providing a optimal layout, comprising a routing and wavelength assignment (RWA) plan, for a given set of demands. A demand is a request for a wavelength between two nodes in the network. A circuit is provisioned to satisfy a demand and is characterized by a route and assigned wavelength number. The terms "demand" and "circuit," as used herein, may be used interchangeably.

While such tools are valuable during network planning to design the cheapest WDM network that can support a projected set of demands, they are of little use in optimizing an operational network, as implementing the recommended RWA requires service disruption.

By way of example, FIG. 1A represents the initial routing and wavelength assignment plan for the set of circuits on a WDM ring of eight nodes (x-axis) and six wavelengths (y-axis). It is assumed that the ring is cut at node 1, for illustration purposes. It is also assumed that demand D is routed along path 5→4→3→2→1→8 and occupies wavelength 2 on the ring. FIG. 1B shows the optimum layout generated by an optimization algorithm such as is disclosed in T. J. Carpenter et al., "Demand Routing and Slotting on Ring Networks;" DIMACS Technical Report, Tech Rep., January 1997, the disclosure of which is incorporated by reference herein. In order to attain the optimal state without service disruption, the network operator requires not only the final RWA as illustrated in FIG. 1B, but more importantly, a sequence of disruption free circuit moves to transition from existing state to optimal state.

However, unlike network design, online or real-time optimization is performed on networks that carry live traffic, so it should be "hitless," i.e., cause no service disruption. Thus, in addition to optimizing the layout of circuits, it is equally desirable to determine a hitless re-routing sequence to migrate the ring from the original to new optimal layout. Otherwise, this effort has little use in practice.

In traditional WDM rings comprising optical add-drop multiplexer (OADM) elements, re-routing traffic was often a very cumbersome task and in many cases, impossible to achieve without disruption. However, newer network elements called Reconfigurable OADM or ROADM elements (see, e.g., A. M. Saleh et al., "Architectural Principles of Optical Regional and Metropolitan Access Networks," Journal of Lightwave Technology, vol. 17, December 1999; and M. D. Feuer et al., "Routing Power: A Metric for Reconfigurable Wavelength Add/Drops," OFC 2002, the disclosures of which are incorporated by reference herein), equipped with optical cross-connects, support a Bridge-n-Roll functionality similar to Automatic Protection Switching (APS). This enables circuits to be first replicated on to the new route/wavelength (bridged), and then switched or rolled over seamlessly with no service hit. This process is akin to make-before-break in Multi Protocol Label Switching (MPLS) networks. ROADM are typically deployed as modular elements with multiple wavelength bands. In such a scenario, a circuit can only be Bridge-n-Rolled to another wavelength in the same band.

On a WDM ring of ROADMs equipped with Bridge-n-Roll functionality, a circuit can be rerouted in three ways: (a) flipping the route from clockwise to counter-clockwise (or vice versa); (b) routing the circuit on a different wavelength; or (c) doing both a and b. For example, one such circuit rerouting sequence to transition from the layout in FIG. 1A to the layout in FIG. 1B is shown in FIG. 2. Principles of the invention address the problem of finding such a sequence, given initial and final RWA layouts.

Thus, online ring optimization requires addressing two critical, yet distinct problems: (1) the routing and wavelength assignment (RWA) for ring topology; and (2) the circuit migration problem.

There is vast body of research on the RWA problem on rings, since it is a variant of the well-addressed Demand Routing and Slotting Problem (DRSP). The ring sizing and the ring loading are specific examples of the DRSP and these are all proven to be NP-hard. Good approximations to these problems do exist. In fact, ring loading can be optimally solved for the case when all demands are of same granularity.

However, there is very little previous work on the circuit migration problem. S. Acharya et al., "Hitless Network Engineering of SONET Rings," Globecom, 2003, the disclosure of which is incorporated by reference herein, addressed online ring optimization problem in an integrated fashion. They found a sub-optimal solution using a cost-based heuristic along with a transition sequence. Although it performs reasonably well in practice, there is no guarantee on quality of solution.

It is therefore apparent that improved techniques are needed for dealing with the issue of providing a circuit migration sequence from a given layout to a known optimal layout obtained using any known optimal layout algorithms.

SUMMARY OF THE INVENTION

The present invention provides techniques for generating a hitless migration plan to optimal state, given an optimal routing and wavelength assignment for demands.

For example, in one aspect of the invention, a technique for use in performing a circuit transition in accordance with an optical ring-based network comprises obtaining a first (e.g., initial) circuit layout and a second (e.g., final) circuit layout for a given set of demands to be routed on the optical ring-based network. The technique then comprises calculating a transition sequence plan useable to transition the network from the first circuit layout to the second circuit layout such that substantially no network service disruption occurs due to the circuit transition. The transition sequence plan is calculated by determining a minimum set of circuits that when moved from first positions in the first circuit layout result in a feasible transition sequence for remaining circuits in the first circuit layout.

The transition sequence plan calculation may further comprise calculating a minimum number of free wavelengths required to move at least the minimum set of circuits. A directed graph may be used to determine the minimum set of circuits.

Further, the transition sequence plan calculation may further comprise utilizing a wavelength equivalence property. With such property, a particular wavelength number assigned to a circuit is inconsequential to the transition sequence plan calculation.

The transition sequence plan calculation may further comprise partitioning the given set of demands into subsets such that each subset can be routed on a single wavelength. A constraint may be applied whereby when a given circuit in the minimum set of circuits is moved to a given wavelength, all circuits in the minimum set of circuits are moved to the same wavelength.

Still further, the transition sequence plan calculation may further comprise utilizing a demand equivalence property. With such property, when the given set of demands to be routed contains two equivalent demands, one of two or more equivalent second circuit layouts can be utilized to calculate the transition sequence plan.

In one illustrative embodiment (referred to as "GM-T" herein), the transition sequence plan calculation may further comprise obtaining a first partition set and a second partition set from the first circuit layout and the second circuit layout, respectively, in accordance with a wavelength equivalence property, and replacing demands in each partition by demand types in accordance with a demand equivalence property. Advantageously, combined benefits of wavelength equivalence and demand equivalence are realized.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1A shows a diagram of an initial layout of a routing and wavelength assignment plan;

FIG. 1B shows a diagram of a final layout of a routing and wavelength assignment plan;

FIG. 2 shows a diagram of a circuit rerouting sequence to transition from the layout in FIG. 1A to the layout in FIG. 1B;

FIG. 3 shows pseudo-code for a dependency graph based migration algorithm, according to an embodiment of the invention;

FIG. 4 shows a dependency graph for the optimization in FIG. 1B, according to an embodiment of the invention;

FIG. 5 shows a diagram of an final layout of a routing and wavelength assignment plan, which is an alternative to FIG. 1B, according to an embodiment of the invention;

FIG. 6 shows pseudo-code for a dependency graph based migration, wavelength equivalence algorithm, according to an embodiment of the invention;

FIG. 7 shows a transition graph, according to an embodiment of the invention;

FIG. 8 shows pseudo-code for a dynamic programming algorithm, according to an embodiment of the invention;

FIG. 10 shows an optimal transition sequence for the dotted path of FIG. 9;

FIGS. 11A and 11B show equivalent RWA layouts based on swapping demands of the same type, according to an embodiment of the invention;

FIG. 12 shows pseudo-code for a greedy, demand-equivalent, dynamic programming algorithm, according to an embodiment of the invention;

FIG. 13 shows a parameter space for simulations, according to an embodiment of the invention;

DETAILED DESCRIPTION OF THE INVENTION

Figure 9:
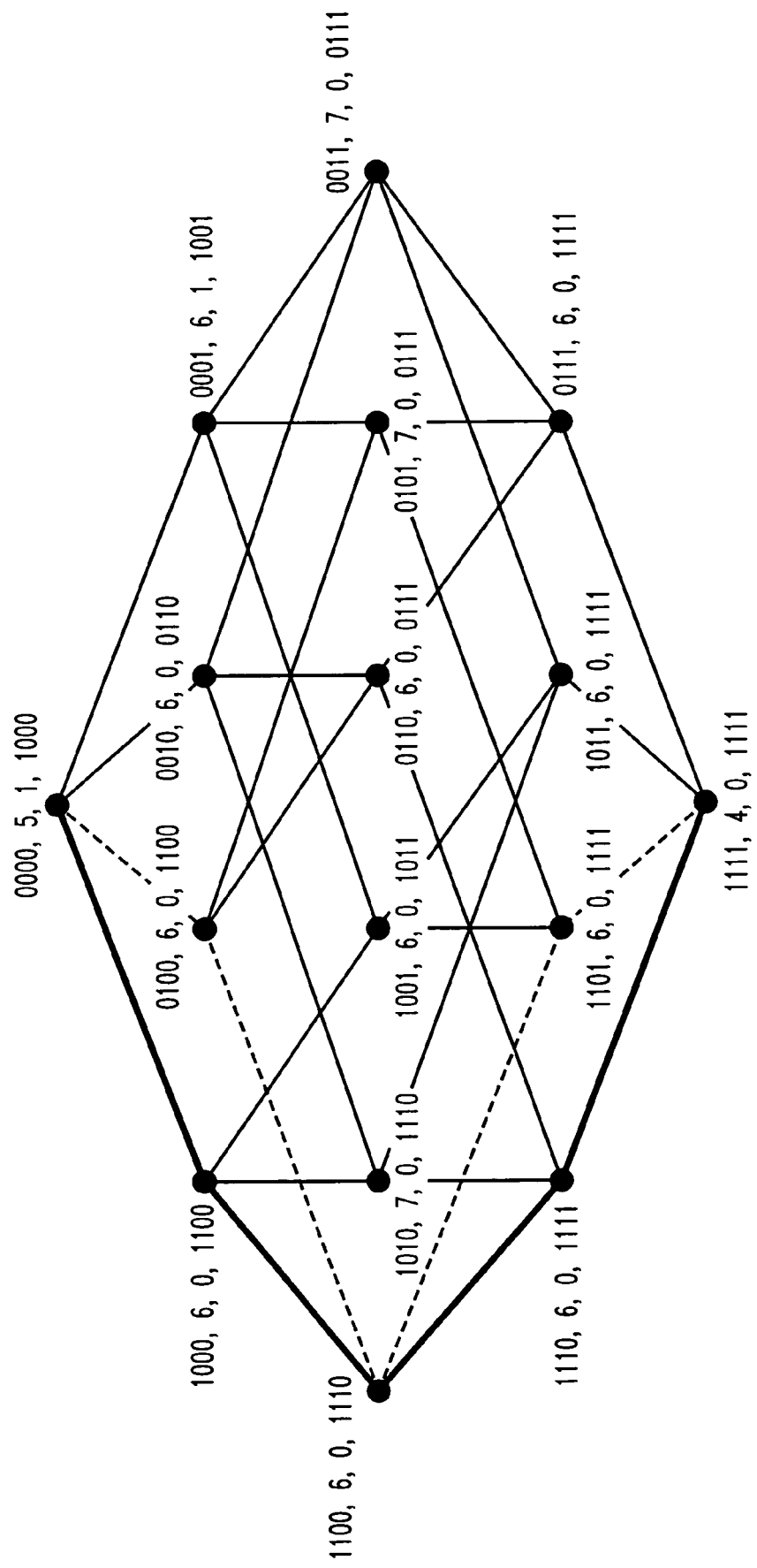
FIG. 9 shows a state diagram with state variables for the transition graph of FIG. 7.

The following description will illustrate the invention in the context of an exemplary WDM ring network. It should be understood, however, that the invention is not necessarily limited to use with any particular type of ring network. The invention is instead more generally applicable to any ring network in which it is desirable to generate a hitless migration plan to optimal state, given an optimal routing and wavelength assignment for demands.

The remainder of the detailed description is subdivided as follows: Section I describes a hitless circuit migration problem (i.e., an optimal ring repacking problem); Section II describes a dependency graph based algorithm for circuit migration; Sections III, IV and V describe respective algorithms which leverage properties of an optimal RWA; Section VI describes performance analysis of the algorithms; and Section VII describes an illustrative computing system that may be used to implement the algorithms.

I. Optimal Ring Re-Packing Problem (ORRP)

In accordance with an illustrative embodiment of the invention, techniques are provided to solve an optimization problem that we refer to as the Optimal Ring Repacking Problem (ORRP). Before formally defining ORRP, we highlight some assumptions.

Transparent optical network: We assume that on a WDM ring intermediate ROADM nodes between source and destination are transparent optical nodes. No wavelength conversion is performed in transit nodes.

Bridge-n-Roll: The ROADM elements consist of tunable lasers, optical cross-connects and 1×2 passive splitters that can be used to reroute/reassign the wavelength. If the ROADM is banded, we assume that a circuit can only be migrated to another wavelength in the same wave band.

We formally define ORRP as follows:

Given: A WDM ring with a set of demands D. Each demand $d_i \in D$ is identified by a tuple $<s_i, t_i>$, $s_i$ and $t_i$ being the source and destination node of $d_i$, respectively. Given current routing and wavelength assignment map $\psi$: $\{d_i \rightarrow \{w_i, o_i\}\}$, where $w_i$ is the wavelength occupied and $o_i$ is the orientation of the demand which can be either clockwise or counter-clockwise. Also, given is a final RWA map $\psi'$: $\{d_i \rightarrow \{w'_i, o'_i\}\}$, which corresponds to the desired optimal state.

Thus, ORRP is: Find a circuit re-routing sequence to transition from $\psi$ to $\psi'$ hitlessly in a Bridge-n-Roll fashion.

Note that even in a minimal circuit rerouting sequence, some circuits may be moved multiple times. Experience suggests that service providers always want to limit the impact of any optimization operation on a single customer. Hence, in addition to hitless migration, we also require that no circuit should be moved more than a fixed number of times (typically just once) during optimization.

In the next several sections, we provide various approaches to solve ORRP described above. Each solution leverages properties of ORRP that are highlighted before the solutions.

II. Dependency Graph for Circuit Migration

From the definition of ORRP, it is evident that we are interested in a certain permutation (sequence) of elements of demand set D, such that all demands can be Bridge-n-Rolled to their final state in that order. Bridge-n-Roll move requires that a route/wavelength to which a circuit is being moved is unoccupied. Hence, in any such sequence, a circuit $d_i$ can not be moved to its final state (route/wavelength) until some other circuit $d_j$ occupying overlapping spans is moved out. This dependency in migration order can be captured by a dependency graph (DG). Given $\psi$ and $\psi'$, one can obtain DG as follows. For each demand $d_i$, create a node $n_i$ in DG. Create a directed edge from node $n_i$ to node $n_j$ if route of demand $d_i$ in $\psi'$ overlaps with route of demand $d_j$ in $\psi$. If DG turns out to be a directed acyclic graph (DAG), then a topological sort of nodes gives the migration sequence for demands.

If the DG is not a DAG, find feedback vertex set F, which is the minimum set of nodes that must be removed from DG to make it acyclic. Set F corresponds to demands that if removed from their initial position lead to a feasible migration sequence for remaining demands. To ensure there is no service disruption for demands corresponding to the feedback vertex set, these demands must be moved to some unused (free) wavelengths. Additionally, the demands in F must be moved twice (once to free wavelengths and then to their final route/wavelength). Note that if sufficient number of free wavelengths are not available to use as buffer, migration can not be performed.

We call this scheme dependency graph based migration (DGBM) algorithm. The pseudo-code is given in FIG. 3. Since finding the minimum feedback vertex set is a NP-complete problem, a heuristic/approximation scheme should be used. By way of example, see G. Even et al., "Approximating Minimum Feedback Sets and Multicuts in Directed Graphs," Algorithmica, vol. 20, no. 2, pp. 151-174, 1998, the disclosure of which is incorporated by reference herein. In our experiments, we use a topological sort based heuristic. Once all the demands that must be migrated to free wavelengths are identified, they are fed to a RWA engine to find the number of free wavelengths required.

For example, a DG for the optimization in FIG. 1B is shown in FIG. 4. The number of buffer wavelengths required for this transition is one since the graph contains a cycle (B→D→G→B). The sequence of moves is as given in FIG. 2. Observe that demand B (the only feedback vertex in dependency graph) is moved twice.

III. Wavelength Equivalence

The DGBM algorithm may require many free wavelengths if the DG has many cycles, and circuits corresponding to the feedback vertex set of the DG are moved twice. To improve the solution, we analyze the optimal layout given by an RWA algorithm. The fundamental question that arises is: Is optimal state given by $\psi'$ unique?

$\psi'$ provides optimal routing and wavelength assignment $(w'_i, o'_i)$ for each demand $(d_i)$. Alternatively, the same information can be represented as a set of tuples $P_f = \{\Theta_1 \ldots \Theta_k\}$, where $\Theta_i$ is the subset of demand set D routed on $i^{th}$ wavelength. The $P_f$ set is essentially a partitioning of D induced by RWA. For example, the $P_f$ set for FIG. 1B is given by $\{<A,C,F,G>, <B,I,K>, <D,J,L>, <E,H,M>, <>, <>\}$. Now consider an alternate layout $\psi''$, where subsets in partition of D are identical to $\psi'$ but their order is changed. Since a demand occupies a single wavelength and all wavelengths are identical in their capacity, it is easy to see that any such layout is equally optimal. An equivalent optimal layout to FIG. 1B is shown in FIG. 5 with:

$P_f = \{<B,I,K>, <D,J,L>, <E,H,M>, <>, <>, <A,C,F,G>\}$.

As is evident, both layouts correspond to the same partition of demand set ($P_f$ set), but differ in the wavelengths assigned to subsets in the partition.

This observation can be generalized to a property we call wavelength equivalence defined as: For a given RWA layout, one can always obtain an equivalent RWA layout by changing wavelength assignment while keeping the partition induced by wavelength assignment unchanged.

Wavelength equivalence implies that in a RWA, the actual wavelength number assigned to a demand is inconsequential, what matters is the partitioning of the demand set into subsets such that each subset can be routed on a single wavelength. Thus, RWA layouts shown in FIG. 1B and FIG. 5 are equivalent and achieving either one as final state is sufficient.

Due to wavelength equivalence, ORRP can be redefined as: Find circuit migration sequence to transition from a given partition $P_o = \{\Theta_{o1} \ldots \Theta_{ok}\}$ of demand set D to a given final partition (optimal) $P_f = \{\Theta_{f1} \ldots \Theta_{fk}\}$ such that each circuit move can be performed in a Bridge-n-Roll manner. The wavelength numbers assigned to each of the subsets in final partition are immaterial.

Wavelength equivalence can be utilized to avoid double moves for demands corresponding to feedback vertex set of DG in DGBM. Before we outline the procedure, let us first define for each demand $d_i$, sets $O_i \in P_o$ and $F_i \in P_f$ as the subsets of demand set D that share a wavelength with $d_i$ in the initial and final RWA, respectively. For the example in FIG. 1, the sets $O_i$ and $F_i$ for demand B are $\{B,A\}$ and $\{B,I,K\}$, respectively. Note that these sets are uniquely characterized by partitioning of the demand set induced by wavelength assignment.

To leverage wavelength equivalence, the DGBM algorithm is modified as follows. In the dependency graph, once a feedback vertex $n_i$ is identified, the corresponding demand $d_i$ and all other demands in $F_i$ are moved to an available free wavelength. The vertices corresponding to these demands are removed from the dependency graph and a topological sort is performed again. The process is repeated until an acyclic graph is found. Note that the final state is not identical to one that was given by RWA algorithm, but it is also optimal by the wavelength equivalence property. The advantage here is no circuit is moved more than once satisfying an important operational criterion. Also, removal of the set of nodes corresponding to $F_i$ of a demand $d_i$ makes the residual graph sparse and more likely to be a DAG. Further, there is no need to perform an additional step of RWA to find the number wavelengths needed to stage the demands in feedback vertex set. The migration can not be performed if the required number of free wavelengths are not available. We call this procedure DGBM-WE. The pseudo-code for DGBM-WE is as shown in FIG. 6. The pseudo-code performs the task of identifying a feedback vertex and topological sort of remaining nodes in a single loop.

Wavelength equivalence increases the number of potential solutions. The DGBM-WE scheme uses layout equivalence to reduce excess moves for some demands, but does not fully exploit its potential. To leverage full potential of wavelength equivalence, we concentrate on a modified definition of ORRP where we are only concerned about partitions of a demand set induced by RWA. The transition from initial partition $P_o$ to final partition $P_f$ of the demand set can be depicted as a bipartite graph, where each node corresponds to a subset in the initial or final partition (set $\{\Theta_{o1} \ldots \Theta_{ok}, \Theta_{f1} \ldots \Theta_{fk}\}$) and an edge represents migration of a demand from its initial subset $\Theta_{oi}$ to final subset $\Theta_{fj}$. We call this graph a transition graph (TG) represented by $G_{104\,\psi}$. The transition graph for FIG. 1 is as shown in FIG. 7.

In transition from initial partition to final partition, the intermediate state of the ring could correspond to any partition of demand set D so long as each subset of partition can be routed on a single wavelength. Hence, the total state space is equal to the number of partitions of a set and is extremely large. A partition of a demand set represents a valid state if each subset in the partition can be routed on a single wavelength. Huge state space coupled with routing complexity to determine validity of a state makes the exploration intractable. To reduce this complexity, we impose a simplifying constraint termed a non-straddling constraint.

The non-straddling constraint is: In any intermediate state, demand $d_i$ either shares a wavelength with all demands in $F_i$ or a subset of demands in $O_i$. This essentially means when a demand $d_i$ is moved, all the demands in $F_i$ are also moved to the same wavelength.

The non-straddling constraint ensures that demand partition $(P_i)$ for any intermediate state can be decomposed into subsets that either appear in final partition $P_f$ or are subsets of sets in $P_o$. Hence, each intermediate state $S_i$ with partition $P_i$ can be uniquely identified by the subsets in $\{P_i \cap P_f\}$. This reduces the state space to $2^{W_f}$, where $W_f$ is number of occupied wavelengths in final layout. This number is often small in practice, particularly in banded ROADM architectures where a circuit can only be moved within its own band.

The non-straddling constraint not only reduces the state space but also ensures that if initial and final partitions of a demand set are routing-feasible, all other states are also feasible, provided sufficient number of wavelengths are available to accommodate all subsets. This is a very significant advantage since a circuit migration scheme constrained by non-straddling constraint does not involve routing. However, the disadvantage of imposing a constraint is we may miss some transition sequences and have to settle on a sequence that requires more free wavelengths. This may force the optimization at relatively lighter load when sufficient number of free wavelengths are available. We show in section VI that it is not a major hindrance and algorithms that impose non-straddling constraint perform quite well in practice.

If the transition graph is not connected, then under single move and non-straddling constraint, each connected component of the transition graph is independent of other components, i.e., transition of demands in a connected component from initial state to their final states will not impact/can not be impacted by demands in other components. Connected component decomposition of the transition graph allows us to find transition sequence for each component independently. This reduces the state space to $$\sum_j 2^{W_{if}},$$

where $W_{if}$ is the number of nodes representing final partition $P_f$ in jth connected component. In case of banded ROADM, each band will form at least one connected component. Also, components with just two nodes represent no circuit moves and hence need not be considered.

IV. Dynamic Programming Migration Algorithm

In this section, we highlight a solution to ORRP utilizing all the properties described in the previous section. We first address the subproblem of finding a circuit migration sequence for a connected component of transition graph. A goal here is to find a sequence that requires a minimum number of free wavelengths.

Given is a connected component of a transition graph with $W_o$ nodes representing initial state and $W_f$ nodes representing final state. From the previous section, we know that the number of states due to wavelength equivalence and the non-straddling constraint is given by $2^{W_f}$. For each state $S_i$, we define $W_i$ as the number of non null subsets in partitioning of demand set D (wavelengths required to route all demands excluding the free wavelengths). We also define $N_{ij}$ as the minimum number of free wavelengths needed to reach from state $S_i$ to $S_j$.

Consider the transition from a state $S_i$ to final state $S_f$ via an intermediate state $S_j$. The minimum number of free wavelengths needed for such a transition is the sum of the minimum number of free wavelengths needed to transition from $S_i$ to $S_j$ ($N_{ij}$) and additional number of free wavelengths needed to transition from $S_j$ to $S_f$. The transition from $S_j$ to $S_f$ can use wavelengths that are freed up in transition from $S_i$ to $S_j$. Number of such wavelengths is given by $\max(0,(W_i-W_j))$. Hence, $$N_{ijf}=N_{ij}+\max(0,N_{jf}-\max(0,(W_i-W_j))) \quad (1)$$

Note that second term on the right hand side is capped from the bottom at zero to ensure that any gain in free wavelengths (i.e., $N_{jf}-\max(0,(W_i-W_j))<0$) is not applied to (subtracted from) $N_{ij}$.

Consider a state $S_j$ obtained from $S_i$ such that $\{P_j \cap P_f\}-\{P_i \cap P_f\}$ contains exactly one subset T. In this case, if a subset of T exists in $P_i$, then we can move the remaining demands in T to this wavelength and incur no cost ($N_{ij}=0$) in transition from $S_i$ to $S_j$. Also, in this case $W_i \geq W_j$. Simplifying equation 1 for this scenario, we get.

$$N_{ijf}=\max(0, N_{jf}-(W_i-W_j)) \quad (2)$$

If a subset of T does not exist in $P_i$, one free wavelength is consumed and $N_{ij}=W_j-W_i=1$. Equation 1 for this scenario is:

$$N_{ijf}=W_j-W_i+N_{jf} \quad (3)$$

Equations 2 and 3 can be expressed together as:

$$N_{ijf}=\max(0, N_{jf}-(W_i-W_j)) \quad (4)$$

Note that if $\Theta_{ix} \in P_i$ exists and has just one demand, then it may be required to change its orientation depending on required orientation in the final state. If $\Theta_{ix}$ has more than one demand, then they are guaranteed to have orientation as required in final state. In any transition from $S_i$ to $S_f$, the next state to $S_i$ is always of type $S_j$ and so:

$$N_{if} = \min(N_{ijf}) \forall S_j s.t. |P_j \cap P_f - P_i \cap P_f| = 1 \qquad (5)$$

We can write an effective dynamic program to find optimal migration $N_{of}$ using equations 4 and 5. For an efficient dynamic program, we need to represent a state with a minimal set of variables. It turns out that a state can be represented as a bit vector of size $W_f$, with each bit corresponding to a subset in final partition. An initial state corresponds to all zeroes, while final state to all ones. Apart from state representation as a bit vector, three variables are needed, namely $W_i$, $N_{if}$ and an index $I_i$ of next state in optimal transition to final state. Further, as a boundary condition, we set $N_{ff}=0$. FIG. 8 shows the pseudo-code for dynamic programming algorithm called DP.

At the termination of dynamic program, one can start at initial state $S_o$ and traverse the sequence of states indexed by $I_i$ to obtain all the intermediate states in transition requiring the minimum number of free wavelengths. For the optimization in FIG. 1, the state space along with the dynamic programming state variables are as shown in FIG. 9. The dotted path shows the optimal transition requiring just one free wavelength. The actual circuit moves can be trivially obtained by noting the set of circuits that differ in their partition from the next intermediate state given by $I_i$. The transitions corresponding to the dotted path in FIG. 9 are as shown in FIG. 10 and the final state achieved is shown in FIG. 5.

The DP algorithm finds the optimum number of free wavelengths needed to migrate from the current state to the final state for a connected component of a transition graph under non-straddling constraint. The algorithm requires time and space that is exponential in number of wavelengths. As mentioned above, ROADM are typically deployed in banded configuration and circuit migrations are only allowed within a band. Typical band sizes are 8 or 16 wavelengths which limits the maximum number of wavelengths in a connected component and hence exponential complexity is tractable.

For WDM systems with relatively large band size (32 wavelengths), we provide a greedy version of DP algorithm termed GM. The greedy strategy works as follows. At an intermediate state $S_i$, test if one of the sets in $P_i$ is a proper subset of some set $\Theta_{fx} \in P_f$, if so migrate to new state $S_j$ such that $P_j \cap P_f - P_i \cap P_f = \Theta_{fx}$. If no such subset exists, then choose the subset of $P_f$ not in $P_i$ with the largest number of elements (i.e., wavelength on which maximum number of demands are routed). The GM algorithm gets away with exponential complexity at the expense of potentially requiring more free wavelength than DP. The migration steps for the transition graph in FIG. 7 are highlighted (bold path from start state to final state) in FIG. 9. In this particular example, the GM algorithm also requires one free wavelength.

The DP and GM algorithms operate on a connected component of a transition graph. If the transition graph has many connected components, then the order in which different connected components are migrated is also important to minimize the number of free wavelengths required for the entire transition. Each connected component requires a certain number of free wavelengths and may potentially free up more wavelengths after the circuit migrations are performed. Consider a set of k components requiring $\{r_1, \ldots, r_k\}$ wavelengths (in ascending order) and freeing up $\{f_1, \ldots, f_k\}$ wavelengths. The wavelengths $f_i$ freed by migration of $i^{th}$ component can be utilized as free wavelengths for other components that are migrated after the $i^{th}$ component. A simple proof by contradiction can be used to show that the greedy strategy of moving component i such that $r_i$ is minimum, is the optimal choice for minimizing the initial free wavelength requirement, if $r_i = r_j$ then choose i if $f_i > f_j$. Hence, the number of free wavelengths needed initially to perform transitions for all components is given by:

$$W = \operatorname{Max}\left(r_i - \sum_{j=1}^{i-1} f_j\right) \forall i \in \{1, \ldots, k\} \qquad (6)$$

V. Demand Equivalence

Wavelength equivalence enables us to exploit the fact that there are several optimal layouts which can be obtained by changing the wavelength assignment while preserving the partitioning of the demand set induced by it. In this section, we extend this concept further to add many more solutions that are also optimal, making the space more solution rich. To understand the intuition, let us first consider the two layouts shown in FIGS. 11A and 11B. FIG. 11A is identical to the one shown in FIG. 1A. FIG. 11B is identical to FIG. 11A in all aspects except wavelength assignment of demands B and H are interchanged. Note that demands B and H are identical, i.e., they have same source and destination. In this case, it is easy to see that if the layout in FIG. 11A is optimal, then so is the layout in FIG. 11B.

This observation can be generalized as a property termed demand equivalence defined as: Given is a layout $\psi'$ for a demand set D. If D contains two identical demands $d_i$ and $d_j$ (i.e., they have same source and destination), one can obtain an equivalent layout $\psi''$ by exchanging route/wavelength assigned to $d_i$ and $d_j$.

On an n node ring, a demand can be one of n(n−1)/2 types (number of source-destination pairs). If the number of wavelengths in a wave band is not very small, the probability that some of the demands are of the same type is very high. For example, on a 8 node, 16 wavelength ring there can be 28 types of demands, but the average number of demands on the ring under high load and uniform distribution will be 64 (average path length for a uniform distribution is n/4, hence on average there will be 4 demands per wavelength). In such a scenario, a large number demands are bound to be identical, thus improving the number of optimal solutions.

Demand equivalence coupled with wavelength equivalence makes the number of optimal solutions large but unfortunately explodes the state space from $2^{W_f}$ to $$2^{W_f} * \prod_{i=1}^{n(n-1)/2} ! num_i$$

where $num_i$ is the number of demands of $i^{th}$ type. This is attributed to the fact that for each valid partition of demand set (one among $2^{W_f}$), any permutation of equivalent demands is acceptable. Hence, an optimal scheme akin to DP will be very expensive, consequently we use a greedy strategy similar to GM.

Once initial and final RWA layouts $\psi$ and $\psi'$ are known, we obtain the initial and final partition sets $P_o$ and $P_f$. We replace demands in each subset by their types ($s_i$ and $t_i$ pair for a demand $d_i$ can be converted to type $ty_i = s_i *(\text{num of nodes}) + t_i$) and obtain sets $T_o$ and $T_f$. A process similar to GM is performed on these sets, except that now we are looking for subsets of sets in $T_f$ and not $P_f$. Care must be taken as there can be multiple identical subsets in $T_f$, hence bookkeeping is used to ensure correct operation. We call this procedure GM-T. The pseudo-code is as shown in FIG. 12. Note that it is trivial to obtain actual demand moves from type moves by keeping track of the demand corresponding to each typed element.

VI. Performance Analysis

In this section, we provide illustrative performance analysis of the various algorithms described above. To study the effectiveness of migration algorithms, we need initial and final RWA for a set of demands on a ring. To simulate real life network operation, we assume that demand request arrival follows Poisson distribution with exponential service (hold) times. The demands are uniformly distributed among source-destination pairs. A demand is satisfied by setting up a circuit on shortest available path using lowest index wavelength (LISP routing). We study the network operation under conditions of no churn (Erlang load $\infty$) and moderate churn (Erlang load of 4*W, where W is number of wavelengths). The spectrum of parameters explored is given in FIG. 13.

For each combination of parameters, we simulate circuit addition deletion until first block. In an experiment with k free wavelengths no demand is allowed to occupy highest k wavelengths. At first block the state of ring corresponds to map $\psi$. To obtain optimal RWA $\psi'$ for the set of demands, we employ the Ring Loading algorithm presented in Y. Myung et al., "Optimal Load Balancing on SONET Bidirectional Rings," Operations Research, vol. 45, January 1997, the disclosure of which is incorporated by reference herein. For wavelength assignment, we use the algorithm by A. Tucker, "Coloring a Family of Circular Arcs," SIAM Journal of Applied Math, vol. 29, 1975, the disclosure of which is incorporated by reference herein. Since Tucker's algorithm is not optimal, sometimes RWA may require more wavelengths than actually available. In such scenario, we simply assume that initial state is optimal and hence requires no circuit migration. To obtain statistically significant results, we performed 1000 experiments for each combination of parameters in FIG. 13.

A. Experiment I: Algorithm Effectiveness

Figure 14:
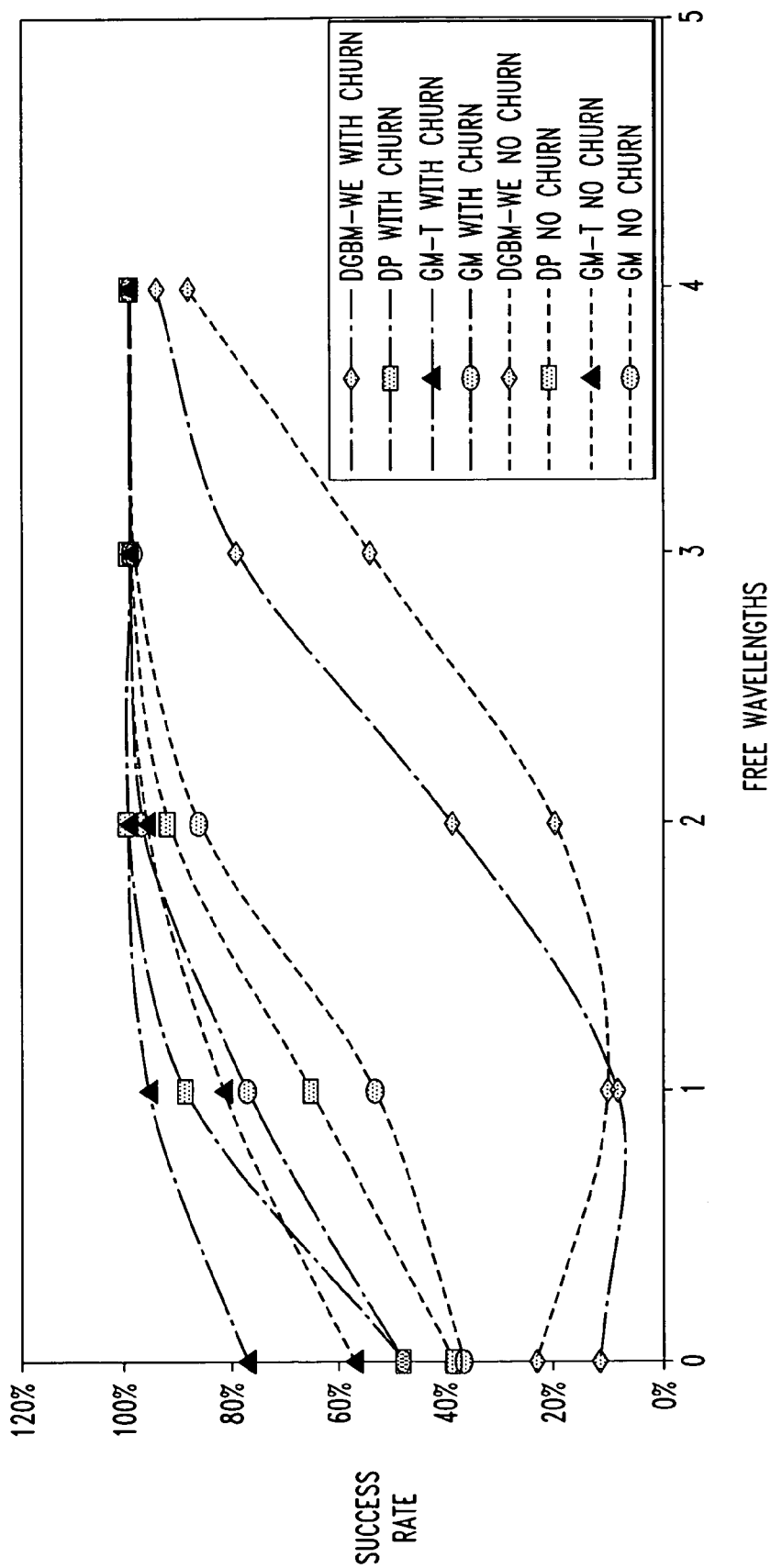
FIG. 14 shows illustrations of effectiveness for migration algorithms, according embodiments of the invention.

All the algorithms provided require some number of free wavelengths to be used as buffer space. A circuit migration algorithm offers a feasible migration sequence if the number of free wavelengths required for the transition are actually available. To compare various algorithms for their effectiveness, we measure success rate for each as a function of number of free wavelengths available. The results of experiment are as shown in FIG. 14. The results are shown only for a 8 node ring with band size of 16 wavelengths but are representative of experiments with other ring and band sizes, results for DGBM algorithm are omitted as it always performs worse than DGBM-WE.

The most visible and obvious trend from FIG. 14 is that the success rate of all algorithms increase if more free wavelengths are available. The DGBM-WE algorithm requires many more free wavelengths to achieve comparable success rate to other schemes. This can be explained by the fact that, in general, the dependency graph is cyclic, forcing DGBM-WE to use free wavelengths to break the dependency chains. In contrast, algorithms that fully exploit wavelength equivalence fare far better. The GM algorithm that makes greedy decisions performs almost as well as the DP algorithm that explores entire state space. The difference between the two is more pronounced when very few (e.g., one) free wavelengths are available.

Overwhelmingly, the GM-T algorithm that exploits both wavelength equivalence and demand equivalence outperforms all other schemes. In fact under churn, it achieves 96% success rate when just one free wavelength is available. The impact of churn is also evident, i.e., all algorithms perform better with churn. This can be attributed to the fact that circuit deletion leaves holes in the layout which the migration algorithms can exploit.

A careful observation reveals that for DGBM-WE algorithm success rate is higher when no free wavelength are available than when one free wavelength is available. This conundrum occurs because, at full load, the RWA engine sometimes fails to offer a better layout and existing layout is assumed as optimal, boosting the success rate unfairly. This bias is pronounced in case of DGBM-WE as very few migrations are successful.

B. Experiment 2: Effect of Ring Size

Figure 15:
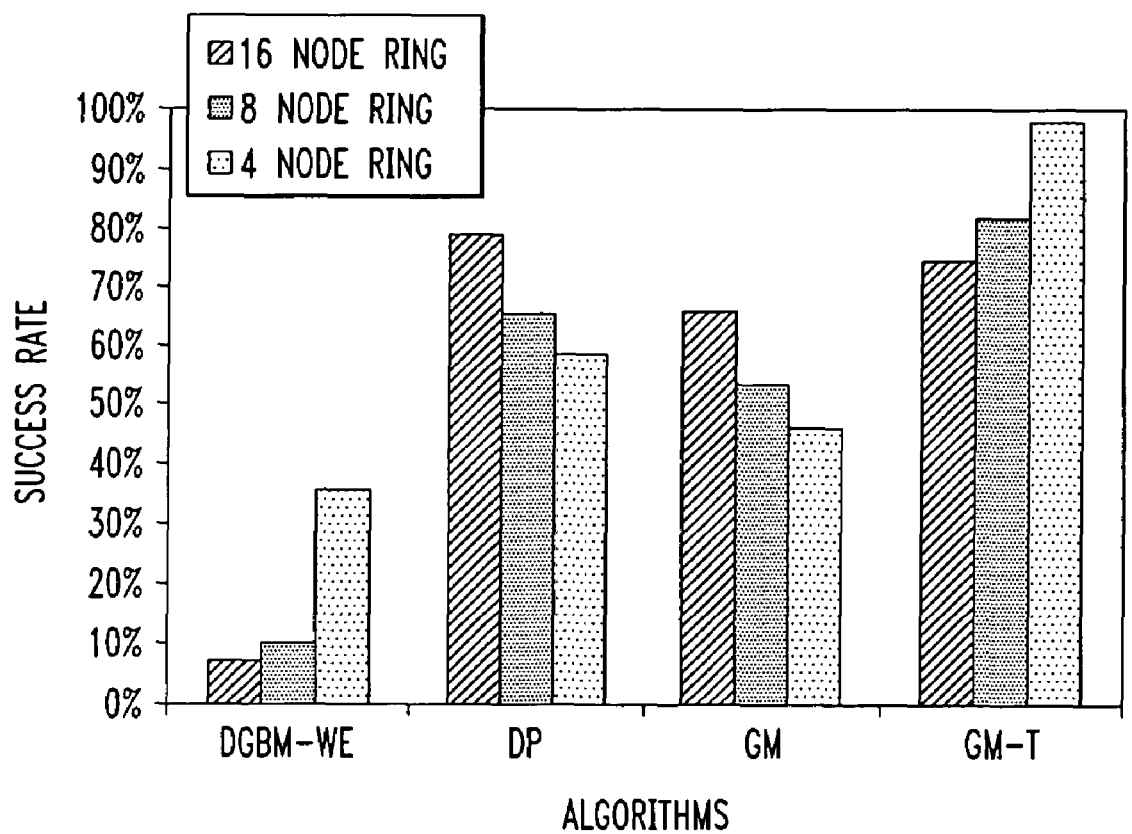
FIG. 15 shows effect of ring size for migration algorithms, according embodiments of the invention.

To understand how the number of nodes in a ring affects the performance of various algorithms, we perform simulations for 4, 8 and 16 node rings. The results for a band of 16 wavelengths under no churn and when one free wavelength (6.25% free) is available are as shown in FIG. 15.

Consider the DGBM-WE algorithm. Its performance is better for a 4 node ring than a 8 or 16 node ring. This is because in a 4 node ring, ⅔ of the demands are among immediate neighbors and the rest are 2 hop. Hence, in the dependency graph, most of nodes have just one outgoing edge. This makes the graph sparse and unlikely to have many cycles, thus improving success rate for DGBM-WE. For DP and GM algorithms, performance is better for larger rings than for smaller rings. This can be attributed to the fact that on smaller rings, most wavelengths are perfectly packed in initial as well as final RWA layouts. Such packing makes finding subsets of sets in the final partition difficult, hurting the success rate of DP and GM algorithms. Note that performance of GM-T for large rings (16 nodes) is similar to GM as demand equivalence is not much of a help due to large number of demand types. GM-T though performs exceptionally well for smaller rings (4, 8 nodes). In small rings, demands are of few types making it more likely to find the typed subsets for final partition sets. The behavior of algorithms under churn (not shown) is similar to one shown in FIG. 15 except that success rates are improved for all of them.

C. Experiment 3: Effectiveness of GM-T for Various Band Sizes

Figure 16:
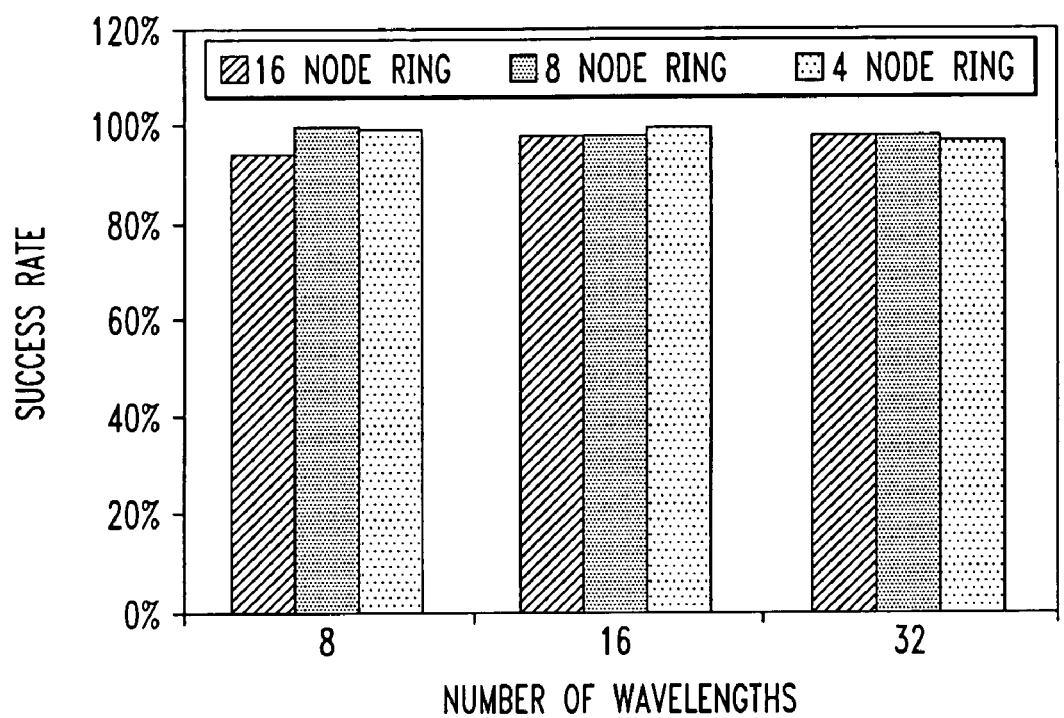
FIG. 16 shows sensitivity of GM-T to band size, according to an embodiment of the invention.

From experiments above, GM-T performs the best. To further establish GM-T as the best in class, we study how its effectiveness varies as a function of band size. The results for the case when free wavelengths are fixed at 12.5% of total wavelengths are shown in FIG. 16 for rings of size 4, 8 and 16 nodes with moderate churn. The success rate for the GM-T algorithm remains high consistently and shows almost no sensitivity to band size for all the ring sizes.

VII. Illustrative Hardware Implementation

Figure 17:
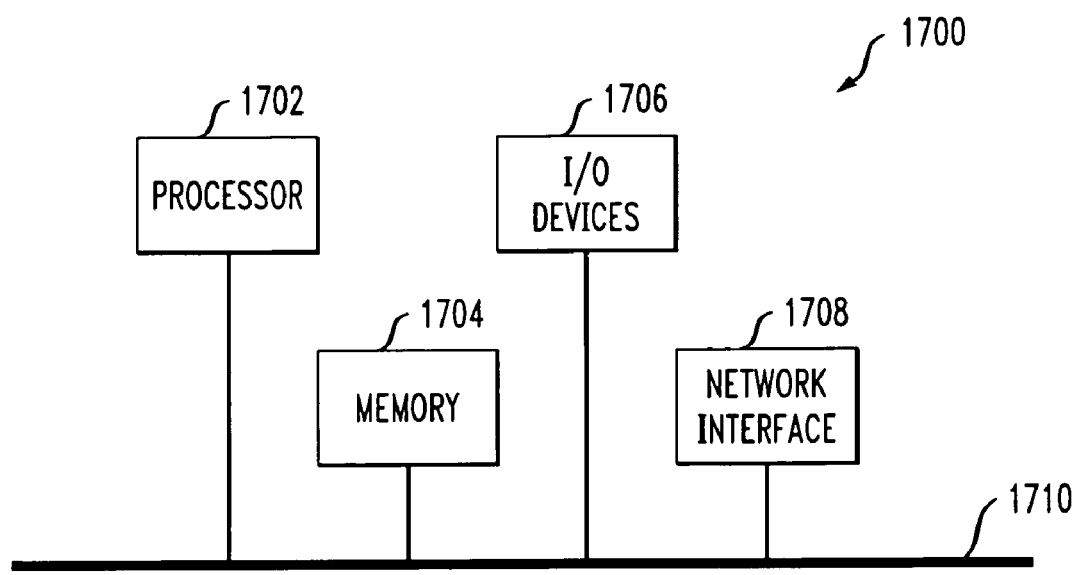
FIG. 17 shows a block diagram of a generalized hardware architecture of a computer system suitable for implementing a system for optimizing utilization in a ring-based network, according to an embodiment of the present invention.

Referring now to FIG. 17, a block diagram illustrates a generalized hardware architecture of a computer system suitable for implementing a system for optimizing utilization in a ring-based network, according to an embodiment of the present invention. More particularly, it is to be appreciated that computer system 1700 in FIG. 17 may be used to implement and perform the methodologies of the invention, as illustratively described above in the context of FIG. 1A through FIG. 16. Also, it is to be understood that one or more network elements may implement such a computing system 1700. Of course, it is to be understood that the invention is not limited to any particular computing system implementation.

Thus, computing system 1700 could be used to determine an optimum circuit transition plan in accordance with the methodologies of the invention described herein such that the plan could then be implemented online on the subject network by a service provider.

In this illustrative implementation, a processor 1702 for implementing at least a portion of the methodologies of the invention is operatively coupled to a memory 1704, input/output (I/O) device(s) 1706 and a network interface 1708 via a bus 1710, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide the inputs used by a system of the invention to generate optimized network utilization results. Alternatively, the inputs could be read into the system from a diskette or from some other source (e.g., another computer system) connected to the computer bus 1710. Also, inputs to the methodologies may be obtained in accordance with the one or more input devices. The output devices may be one mechanism for a user or other computer system to be presented with results of the methodologies of the invention.

Still further, the phrase "network interface" as used herein is intended to include, for example, one or more devices capable of allowing the computing system 1700 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of networks, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 1702.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

I claim:

1. A processor-implemented method for use in performing a circuit transition in accordance with an optical ring-based network, comprising the steps of:

obtaining a first circuit layout and a second circuit layout for a given set of demands to be routed on the optical ring-based network; and calculating by a processor a transition sequence plan useable to transition the network from the first circuit layout to the second circuit layout such that substantially no network service disruption occurs due to the circuit transition;

wherein the transition sequence plan is calculated by determining a minimum set of circuits that when moved from first positions in the first circuit layout result in a feasible transition sequence for remaining circuits in the first circuit layout.

2. The method of claim 1, wherein the transition sequence plan calculation step further comprises calculating a minimum number of free wavelengths required to move at least the minimum set of circuits.

3. The method of claim 1, wherein the transition sequence plan calculation step further comprises utilizing a directed graph to determine the minimum set of circuits.

4. The method of claim 1, wherein the transition sequence plan calculation step further comprises utilizing a wavelength equivalence property.

5. The method of claim 4, wherein a particular wavelength number assigned to a circuit is inconsequential to the transition sequence plan calculation.

6. The method of claim 1, wherein the transition sequence plan calculation step further comprises partitioning the given set of demands into subsets such that each subset can be routed on a single wavelength.

7. The method of claim 1, wherein the transition sequence plan calculation step further comprises applying a constraint whereby when a given circuit in the minimum set of circuits is moved to a given wavelength, all circuits in the minimum set of circuits are moved to the same wavelength.

8. The method of claim 1, wherein the transition sequence plan calculation step further comprises utilizing a demand equivalence property.

9. The method of claim 8, wherein, when the given set of demands to be routed contains two equivalent demands, one of two or more equivalent second circuit layouts can be utilized to calculate the transition sequence plan.

10. The method of claim 1, wherein the first circuit layout is an initial circuit layout and the second circuit layout is a final circuit layout.

11. The method of claim 1, wherein the transition sequence plan calculation step further comprises:
    obtaining a first partition set and a second partition set from the first circuit layout and the second circuit layout, respectively, in accordance with a wavelength equivalence property; and
    replacing demands in each partition by demand types in accordance with a demand equivalence property.

12. Apparatus for use in performing circuit transition in accordance with an optical ring-based network, comprising:
    a memory; and
    at least one processor coupled to the memory and operative to: (i) obtain a first circuit layout and a second circuit layout for a given set of demands to be routed on the optical ring-based network; and (ii) calculate a transition sequence plan useable to transition the network from the first circuit layout to the second circuit layout such that substantially no network service disruption occurs due to the circuit transition, wherein the transition sequence plan is calculated by determining a minimum set of circuits that when moved from first positions in the first circuit layout result in a feasible transition sequence for remaining circuits in the first circuit layout.

13. The apparatus of claim 12, wherein the transition sequence plan calculation operation further comprises utilizing a wavelength equivalence property.

14. The apparatus of claim 12, wherein the transition sequence plan calculation operation further comprises utilizing a demand equivalence property.

15. The apparatus of claim 12, wherein the transition sequence plan calculation operation further comprises:
    obtaining a first partition set and a second partition set from the first circuit layout and the second circuit layout, respectively, in accordance with a wavelength equivalence property; and
    replacing demands in each partition by demand types in accordance with a demand equivalence property.

16. The apparatus of claim 12, wherein the first circuit layout is an initial circuit layout and the second circuit layout is a final circuit layout.

17. An article of manufacture comprising a machine-readable medium storing one or more programs for use in performing circuit transition in accordance with an optical ring-based network, the one or more programs when executed in a processor implementing a method comprising the steps of:
    obtaining a first circuit layout and a second circuit layout for a given set of demands to be routed on the optical ring-based network; and
    calculating a transition sequence plan useable to transition the network from the first circuit layout to the second circuit layout such that substantially no network service disruption occurs due to the circuit transition;
    wherein the transition sequence plan is calculated by determining a minimum set of circuits that when moved from first positions in the first circuit layout result in a feasible transition sequence for remaining circuits in the first circuit layout.

18. The article of claim 17, wherein the transition sequence plan calculation step further comprises utilizing a wavelength equivalence property.

19. The article of claim 17, wherein the transition sequence plan calculation step further comprises utilizing a demand equivalence property.

20. The article of claim 17, wherein the transition sequence plan calculation step further comprises:
    obtaining a first partition set and a second partition set from the first circuit layout and the second circuit layout, respectively, in accordance with a wavelength equivalence property; and
    replacing demands in each partition by demand types in accordance with a demand equivalence property.

* * * * *